United States Patent
Sanzo

(10) Patent No.: US 7,157,943 B2
(45) Date of Patent: Jan. 2, 2007

(54) FREQUENCY SELECTION OF SWITCH MODE POWER CONVERTERS VIA SOFTSTART VOLTAGE LEVEL

(75) Inventor: Christopher J. Sanzo, Providence, RI (US)

(73) Assignee: Texas Instruments Incorporated, Dallas, TX (US)

( * ) Notice: Subject to any disclaimer, the term of this patent is extended or adjusted under 35 U.S.C. 154(b) by 330 days.

(21) Appl. No.: 10/748,861

(22) Filed: Dec. 30, 2003

(65) Prior Publication Data

US 2005/0141162 A1    Jun. 30, 2005

(51) Int. Cl.
*G01R 23/02* (2006.01)
(52) U.S. Cl. .................. 327/44; 323/238; 327/100
(58) Field of Classification Search .............. None
See application file for complete search history.

(56) References Cited

U.S. PATENT DOCUMENTS

| | | | |
|---|---|---|---|
| 5,610,503 A * | 3/1997 | Fogg et al. ............... 323/283 |
| 5,712,775 A | 1/1998 | Wu ........................... 363/49 |
| 6,094,362 A | 7/2000 | Domingo ................... 363/21 |
| 6,107,851 A | 8/2000 | Balakirshnan et al. ..... 327/172 |
| 6,172,493 B1 | 1/2001 | Grant ........................ 323/288 |
| 6,465,993 B1 * | 10/2002 | Clarkin et al. ............. 323/272 |
| 6,480,367 B1 * | 11/2002 | Shi et al. .................... 361/18 |

OTHER PUBLICATIONS

"Dual, Voltage Mode, DDR Selectable, Synchronous, Step-Down Controller for Notebook System Power," Texas Instruments, 2003.

* cited by examiner

*Primary Examiner*—My-Trang Nu Ton
(74) *Attorney, Agent, or Firm*—W. James Brady, III; Frederick J. Telecky, Jr.

(57) ABSTRACT

A switch mode power converter that limits the in-rush current at start-up and reduces the occurrence of output voltage overshoot over a range of switching frequencies. The converter includes at least one Soft-Start (SS)/Frequency-Select(FS) input, at least one oscillator enable input, and an oscillator having at least one control input. Soft-start programming is linked to the frequency selection of the converter. An external capacitor connected between the SS/FS input and ground is employed to program the soft-start time, and the switching frequency generated by the oscillator is selected via the state of the SS/FS input.

20 Claims, 3 Drawing Sheets

FREQUENCY SELECTION OF SWITCH MODE POWER CONVERTERS VIA SOFTSTART VOLTAGE LEVEL

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present application relates generally to switch mode power supplies, and more specifically to switch mode power converters providing improved control of in-rush current and output voltage overshoot.

In recent years, the need for switch mode power supplies or DC-to-DC converters has risen dramatically as Integrated Circuits (ICs) such as Digital Signal Processors (DSPs) and mixed signal ICs have continued to decrease in size while their power consumption has increased. Switch mode power converters are typically employed in such ICs for converting positive or negative input supply voltages to output supply voltage levels that are appropriate for powering circuitry within the IC and/or for powering circuitry externally connected to the IC. For example, a switch mode power converter may be configured for either increasing or decreasing an input supply voltage level provided to an IC.

Conventional switch mode power converters typically include at least one soft-start circuit configured to limit in-rush currents at start-up. For example, an excessive in-rush current can cause an output voltage overshoot, which can disrupt the operation of a system processor by triggering unwanted resets. Further, excessive in-rush currents can increase the maximum current through converter components and require the use of components with increased maximum current ratings, significantly increasing the overall cost of the converter. A soft-start circuit typically feeds a constant current to an external capacitor to charge the capacitor, thereby ramping supply and reference voltages within the converter and limiting in-rush currents.

One drawback of conventional switch mode power converters is that the soft-start circuits employed therewith often do not successfully limit in-rush currents for all power converter frequencies. For example, a soft-start circuit may sufficiently limit in-rush currents when the converter operates at relatively low frequencies, but the soft-start circuit may be unable to limit in-rush currents at higher converter frequencies. As a result, while output voltage overshoots caused by excessive in-rush currents may be effectively eliminated at high duty ratios and low frequencies, output voltage overshoots may persist at low duty ratios and high frequencies.

Moreover, conventional switch mode power converters typically require more than one input for programming the soft-start timing and the converter frequency selection, thereby increasing the number of pins on the IC package and increasing costs.

It would therefore be desirable to have a switch mode power converter that limits the in-rush current at start-up over a range of switching frequencies and avoids the drawbacks of the above-described conventional switch mode power converters.

BRIEF SUMMARY OF THE INVENTION

In accordance with the present invention, a switch mode power converter is provided that limits the in-rush current at start-up and reduces the occurrence of output voltage overshoot over a substantial range of switching frequencies. Benefits of the presently disclosed switch mode power converter are achieved by linking soft-start programming to the selected switching frequency of the converter.

In one embodiment, the switch mode power converter includes at least one Soft-Start(SS)/Frequency-Select(FS) input, at least one oscillator enable input, and an oscillator having at least one control input. The oscillator is operative to generate a selected one of a plurality of frequencies based on the state of the control input. The SS/FS input is connectable to ground (1) via an external capacitor, or (2) via the external capacitor and an external resistor connected in parallel. In the event only the external capacitor is connected between the SS/FS input and ground, an open circuit is effectively formed between the SS/FS input and ground for Direct-Current (DC). In the event the parallel combination of the external capacitor and the external resistor is connected between the SS/FS input and ground, a resistive path is made available from the SS/FS input to ground. In effect, the SS/FS input has a high logical state when only the external capacitor is connected between the SS/FS input and ground, and the SS/FS input has a low logical state when the external capacitor and the external resistor are connected in parallel between the SS/FS input and ground. At least one control signal representative of the state of the SS/FS input is applied to the oscillator control input, which is employed to select the frequency generated by the oscillator.

In the presently disclosed switch mode power converter, soft-start programming is linked to the frequency selection of the converter. The soft-start programming is accomplished via one or more external capacitive and/or resistive components connected between the SS/FS input and ground. In the presently disclosed embodiment, an external capacitor having a predetermined value connected between the SS/FS input and ground is employed to program the soft-start time based on the value of the capacitor. A constant current fed to the external capacitor ramps the voltage level at the SS/FS input during start-up. The switching frequency generated by the oscillator is selected via the state of the SS/FS input. In the preferred embodiment, the switch mode power converter includes dual SS/FS inputs. The oscillator generates (1) a high switching frequency when only external capacitors are connected between the respective SS/FS inputs and ground, (2) a low switching frequency when parallel combinations of an external capacitor and an external resistor are connected between the respective SS/FS inputs and ground, and (3) an intermediate switching frequency when only an external capacitor is connected between one of the SS/FS inputs and ground, and a parallel combination of an external capacitor and an external resistor is connected between the other SS/FS input and ground.

By providing a switch mode power converter in which soft-start programming is linked to the frequency selection of the converter, in-rush current at start-up and output voltage overshoot can be decreased over a range of switching frequencies. Further, because the switching frequency is determined by the state of the SS/FS input, both the soft-start timing and the switching frequency selection can be programmed via the same input pin, thereby obviating the need for separate pins to program the soft-start timing and the switching frequency of the converter.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

A switch mode power converter is disclosed that is capable of limiting the in-rush current at start-up and reducing the occurrence of output voltage overshoot over a range of converter frequencies. The presently disclosed switch mode power converter includes soft-start circuitry in which soft-start programming is linked to the frequency selection of the converter.

Figure 1:
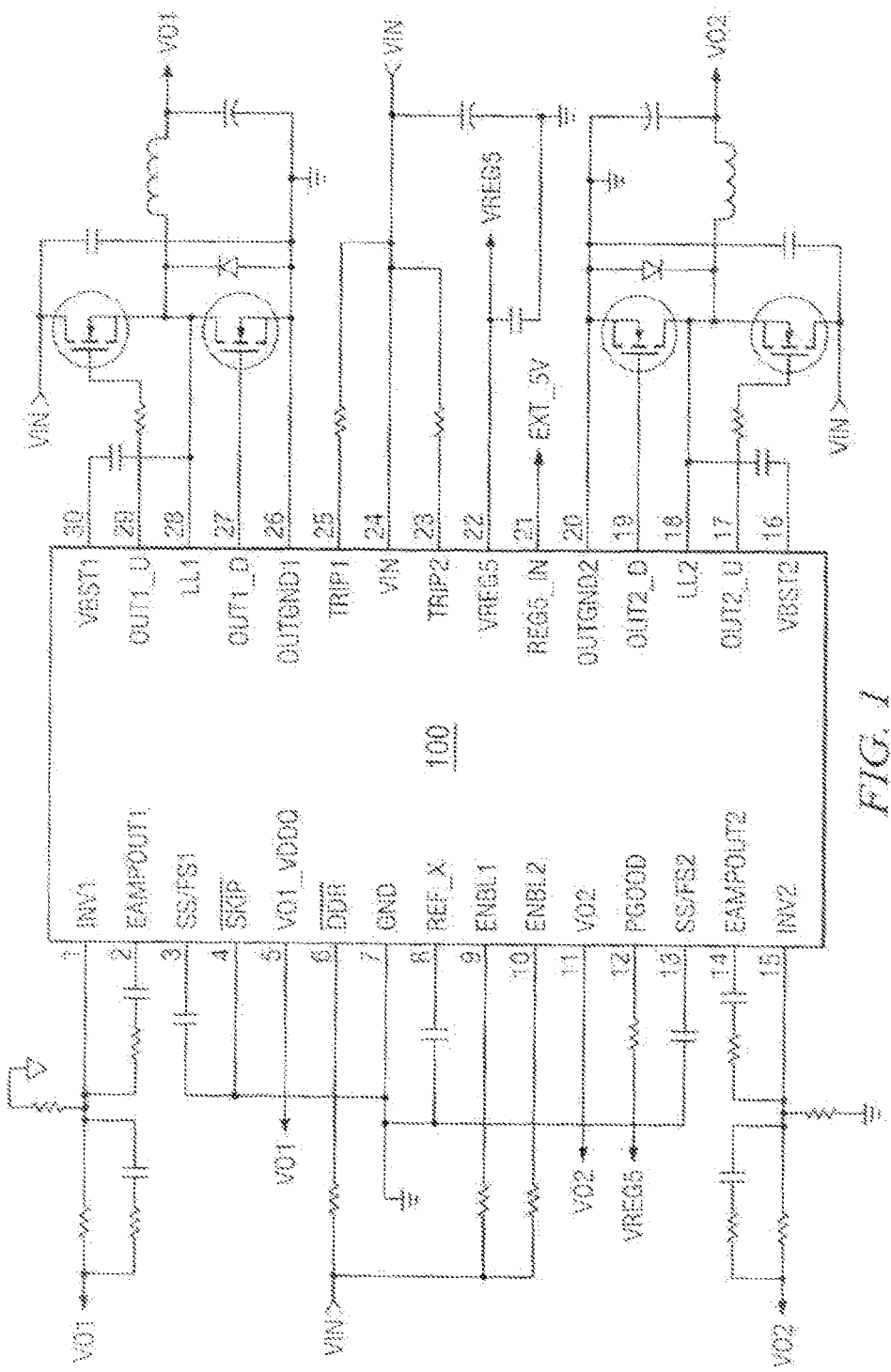
FIG. 1 is a schematic diagram of a typical application of a switch mode power converter according to the present invention.

FIG. 1 depicts an illustrative embodiment of an application of a Switch Mode Power Converter (SMPC) 100, in accordance with the present invention. As shown in FIG. 1, the SMPC 100 includes Soft-Start/Frequency-Select (SS/FS) inputs 1–2, inputs INV1–INV2 and outputs $EAMP_{OUT1}$–$EAMP_{OUT2}$ corresponding to respective error amplifiers 1–2 within the SMPC 100, and inputs ENBL1–ENBL2 for enabling the operation of the SMPC 100. It is noted that details of the structure and operation of the illustrative switch mode power converter 100 of FIG. 1 are described in the data sheet Dual, Voltage Mode, DDR Selectable, Synchronous, Step-Down Controller for Notebook System Power, TPS51020, Texas Instruments® Incorporated, SLUS564A—July 2003—revised November 2003, pages 1–24, which is incorporated herein by reference.

Figure 2:
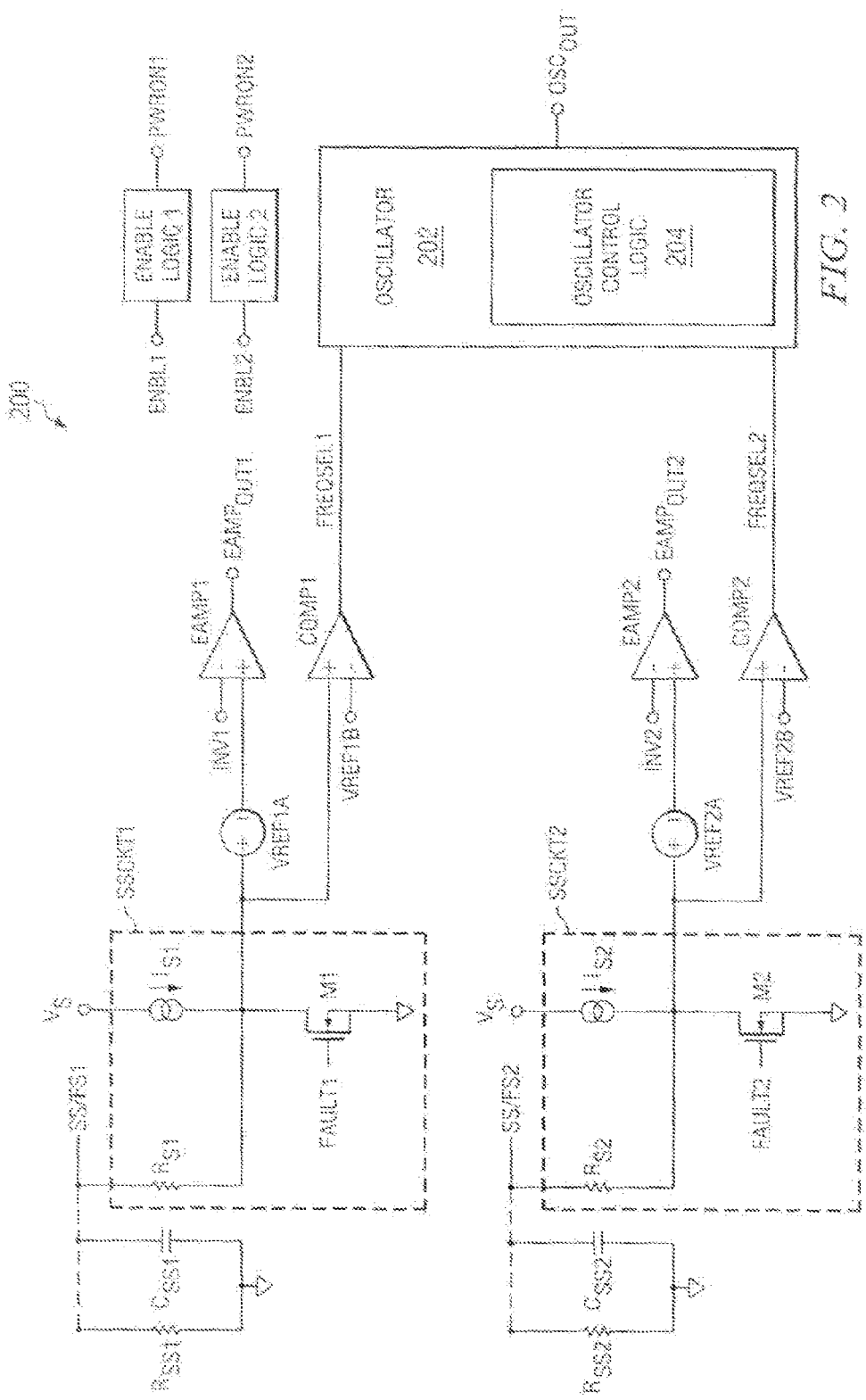
FIG. 2 is a schematic diagram of soft-start circuitry within the switch mode power converter of FIG. 1 for limiting the in-rush current at start-up and reducing output voltage overshoot.

FIG. 2 depicts an illustrative embodiment of Switch Mode Power Converter (SMPC) circuitry 200 included in the SMPC 100 of FIG. 1. In the illustrated embodiment, the SMPC circuitry 200 includes dual soft-start circuits (SS-CKTs) 1–2, the plurality of error amplifiers (EAMPs) 1–2, a plurality of comparators (COMPs) 1–2, an oscillator 202 including oscillator control logic circuitry 204, and enable logic circuitry 1–2 for enabling the operation of the oscillator 202. The soft-start circuits 1–2 include the respective Soft-Start/Frequency-Select (SS/FS) inputs 1–2, respective resistors $R_s1$–$R_s2$, respective current sources $I_s1$–$I_s2$, and respective NMOS Field Effect Transistors (FETs) M1–M2. The SMPC circuitry 200 further includes voltage references VREF1A–VREF2A coupled to non-inverting inputs of the error amplifiers 1–2, respectively. Moreover, the comparators 1–2 have suitable voltage reference values VREF1B–VREF2B connected to their respective inverting inputs. The comparators 1–2 provide frequency select (FREQSEL) signals 1–2 to the oscillator 202, which is operative to generate an oscillator output signal ($OSC_{OUT}$) having a frequency that is selected based on the states of the signals FREQSEL1–FREQSEL 2.

It is appreciated that the switch mode power converter circuitry 200 comprises a portion of the switch mode power converter 100 (see FIG. 1), such as the above-mentioned TPS51020 switch mode power converter manufactured by Texas Instruments® Incorporated or any other suitable switch mode power converter device. Specifically, the SMPC circuitry 200 comprises the portion of the switch mode power converter 100 that relates to soft-start programming and switching frequency selection. It should be noted, however, that the SMPC circuitry 200 including the soft-start circuits 1–2 (SSCKT1–SSCKT2) may be employed in any other suitable circuit application.

In the preferred embodiment, each of the error amplifiers 1–2 has a wide-bandwidth and a low output impedance, and is employed as a voltage servo control block in a Pulse Width Modulation (PWM) control block utilizing a fixed-frequency, feed-forward, voltage-mode control scheme. For example, in the event the error amplifiers 1–2 are employed in conjunction with the above-mentioned TPS51020 SMPC device, such a control scheme provides efficient down conversion with good line regulation and fast transient response. Further, loop compensation may be programmed by connecting external filter networks between the outputs $EAMP_{OUT1}$–$EAMP_{OUT2}$ and the inputs INV1–INV2, respectively, of the error amplifiers 1–2.

The enable logic circuitry 1–2 is configured to receive the inputs ENBL1–ENBL2 and to provide outputs PWRON1–PWRON2, respectively. With respect to the above-mentioned TPS51020 SMPC device, the inputs ENBL1–ENBL2 are TTL inputs. Further, in the event logical high level signals are provided at both of the inputs ENBL1–ENBL2, the oscillator 202 is turned-on; in the event logical low level signals are provided at the inputs ENBL1–ENBL2, the oscillator 202 is turned-off.

In the presently disclosed embodiment, external capacitors $C_{SS1}$–$C_{SS2}$ may be connected between the inputs SS/FS1–SS/FS2 and ground, respectively. For example, suitable values of the capacitors $C_{SS1}$–$C_{SS2}$ may be connected to the inputs SS/FS1–SS/FS2 for adjusting the soft-start time of the soft-start circuits 1–2. During normal operation of the soft-start circuits 1–2, constant currents generated by the current sources $I_{S1}$–$I_{S2}$ flow through the resistors $R_{S1}$–$R_{S2}$ to charge the capacitors $C_{SS1}$–$C_{SS2}$, thereby ramping the voltage references VREF1A–VREF2A during start-up. It is noted that the capacitors $C_{SS1}$–$C_{SS2}$ may be discharged by asserting FAULT1–FAULT2 high, respectively, or by asserting the inputs ENBL1–ENBL2 low. Alternatively, parallel combinations of the external capacitors $C_{SS1}$–$C_{SS2}$ and external resistors $R_{SS1}$–$R_{SS2}$ may be connected between the inputs SS/FS1–SS/FS2 and ground, respectively.

As described above, suitable values of the capacitors $C_{SS1}$–$C_{SS2}$ are connected to the inputs SS/FS1–SS/FS2, respectively, to adjust the soft-start time of the soft-start circuits 1–2. Soft-start is achieved via the soft-start circuits 1–2 by slowly ramping the error amplifier voltage references VREF1A–VREF2 A by following a buffered version of the SS/FS1–SS/FS2 input voltages. It is noted that in an alternative embodiment, a desired start-up sequence may be obtained by providing suitable external timing signals to the inputs SS/FS1–SS/FS2 since the start-up times do not depend on the load current. The soft-start time is programmable by the external capacitors $C_{SS1}$–$C_{SS2}$ connected from the inputs SS/FS1–SS/FS2, respectively, to ground. Each of the inputs SS/FS1–SS/FS2 sources a constant current, e.g., about 2.3 µA. The output voltage of the switch mode power converter ramps up from 0 volts to its target regulation voltage as the voltages on the inputs SS/FS1 and/or SS/FS2 increase from, e.g., 0 volts to about 1 volt. Accordingly, a representative soft-start time formula may be expressed as $$C_{SSx}(\text{Farads}) = T_{SS}(\text{sec}) \times 2.3 \times 10^{-6} \quad (1)$$

As also described above, the oscillator output signal $OSC_{OUT}$ has a frequency that is selected based on the states of the signals FREQSEL1–FREQSEL2. In the preferred embodiment, $$\text{VREF1B} = \text{VREF2B} = 3.5 \text{ volts.} \quad (2)$$

Accordingly, the state of the signals FREQSEL1–FREQSEL2 is logical high when only the capacitors $C_{SS1}$–$C_{SS2}$ are connected between the inputs SS/FS1–SS/FS2 and ground, respectively. Further, the state of the signals FREQSEL1–FREQSEL2 is logical low when parallel combinations of the capacitors $C_{SS1}$–$C_{SS2}$ and the resistors $R_{SS1}$–$R_{SS2}$ are connected between the inputs SS/FS1–SS/FS2 and ground, respectively. Because the soft-start timing and the switching frequency selections are determined by the voltage levels at the inputs SS/FS1–SS/FS2, the selections of both the soft-start time and the switching frequency can be made at the same input pin of the converter.

In the presently disclosed embodiment, the oscillator control logic 204 is configured so that the frequency generated at the output $OSC_{OUT}$ of the oscillator 102 is as described in the following TABLE:

TABLE

| SS/FS1 | SS/FS2 | FREQUENCY (kHz) |
|---|---|---|
| $C_{SS1}$ only to gnd | $C_{SS2}$ only to gnd | High frequency |
| $R_{SS1} \| C_{SS1}$ to gnd | $C_{SS2}$ only to gnd | Intermediate freq. |
| $C_{SS1}$ only to gnd | $R_{SS2} \| C_{SS2}$ to gnd | Intermediate freq. |
| $R_{SS1} \| C_{SS1}$ to gnd | $R_{SS2} \| C_{SS2}$ to gnd | Low frequency | in which "$C_{SSx}$ only to gnd" means that only the external capacitor $C_{SSx}$ is connected between the designated input SS/FSx and ground, and "$R_{SSx} \| C_{SSx}$ to gnd" means that the parallel combination of $R_{SSx}$ and $C_{SSx}$ is connected between the designated input $C_{SSx}$ and ground.

In the preferred embodiment, $$R_{SS1} = R_{SS2} = 1 \text{ M}\Omega \quad (3)$$

$$\text{High frequency} = 450 \text{ kHz} \quad (4)$$

$$\text{Intermediate freq.} = 360 \text{ kHz} \quad (5)$$

$$\text{Low frequency} = 270 \text{ kHz} \quad (6)$$

Figure 3A:
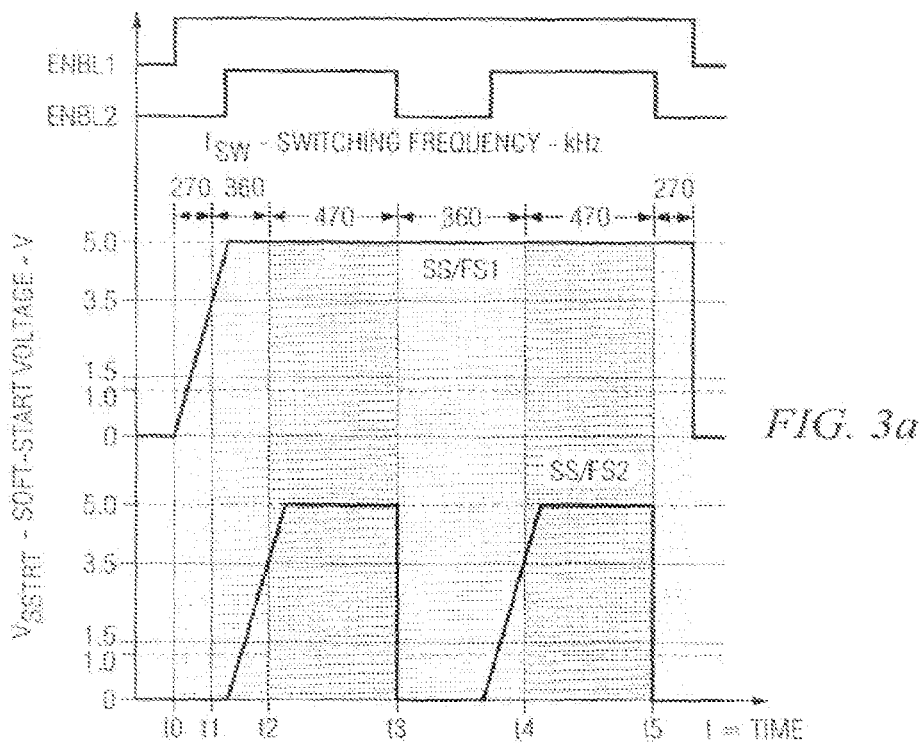
FIGS. 3a–3b are timing diagrams illustrating soft-start signals generated by the soft-start circuitry of FIG. 2.
Figure 3B:
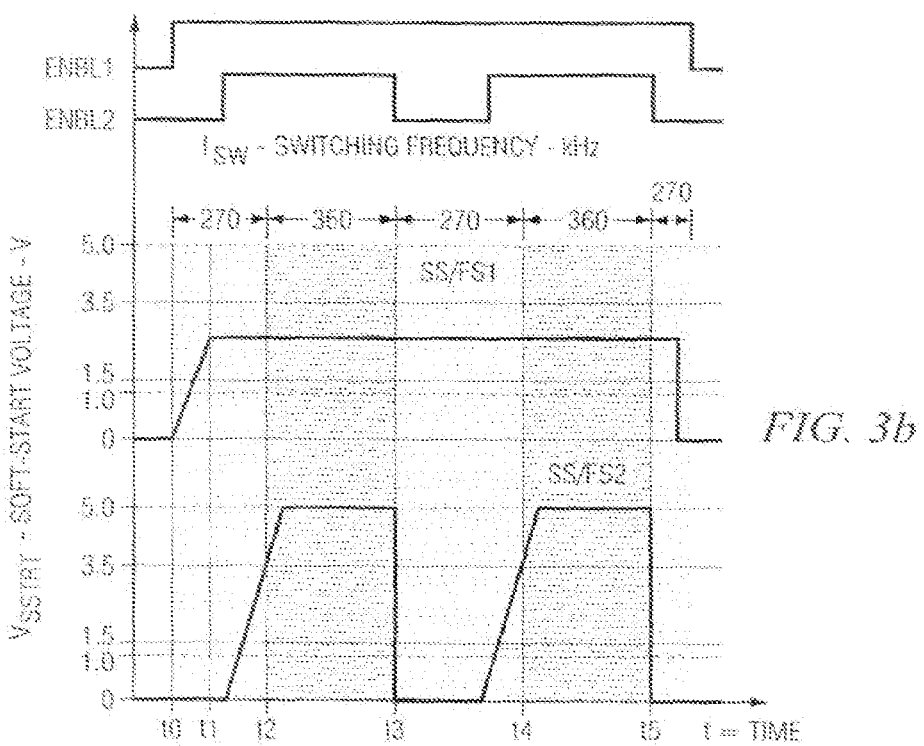

FIGS. 3a–3b depict illustrative soft-start voltage waveforms on the inputs SS/FS1–SS/FS2 and illustrative waveforms on the inputs ENBL1–ENBL2. Specifically, FIG. 3a depicts the soft-start voltage waveforms when the high frequency (e.g., 450 kHz) is the selected switching frequency, and FIG. 3b depicts the soft-start voltage waveforms when the intermediate frequency (e.g., 360 kHz) is the selected switching frequency.

As shown in FIG. 3a, the high switching frequency of 450 kHz is attained when both SS/FS1–SS/FS2 input voltages exceed 3.5 volts. The switching frequency begins with 270 kHz in a first stage of the soft-start from time t0 to time t1, increases to 360 kHz in a second stage of the soft-start from time t1 to time t2, and increases to 470 kHz at the steady state. As shown in FIG. 3b, the intermediate switching frequency of 360 kHz is attained when the SS/FS1 input voltage is kept below 3.5 volts and the SS/FS2 input voltage exceeds 3.5 volts. The switching frequency begins with 270 kHz in a first stage of the soft-start from time t0 to time t2, and increases to 360 kHz at the steady state. It is noted that when the low switching frequency of 270 kHz is the selected frequency, both of the SS/FS1–SS/FS2 input voltages are kept below 3.5 volts so that the frequency is 270 kHz for the entire period of soft-start operation.

Accordingly, the switch mode power converter starts at a low frequency and switches over to higher frequencies, based on the SS/FS1–SS/FS2 input voltage levels, only after the converter output voltage has stabilized. By linking the soft-start full scale range to the selection of higher order frequencies of the switch mode power converter, as depicted in FIGS. 3a–3b, improved control of in-rush currents at start-up and output voltage overshoots is achieved.

Having described the above illustrative embodiments, other alternative embodiments or variations may be made. For example, it was described that suitable values of the capacitors $C_{SS1}$–$C_{SS2}$ and the resistors $R_{SS1}$–$R_{SS2}$ may be connected between the inputs SS/FS1–SS/FS2 and ground for determining the state at the inputs SS/FS1–SS/FS2 and for adjusting the soft-start time of the soft-start circuits 1–2. However, it should be understood that the advantages of the presently disclosed embodiment may be achieved using any one-time use timing pin such as a soft-start timing pin (e.g., the SS/FS1–SS/FS2 input pins), a power-on reset timing pin, or any other suitable timing pin, so long as the ramp height of the timing signal exceeds its relevant dynamic range. For example, if a power-on reset ramp charges from 0–2 volts (i.e., its relevant dynamic range is from 0–2 volts) and the supply voltage is equal to 5 volts, then the voltage range from 2–5 volts is unused. This unused portion of the voltage range 0–5 volts may be employed for selectively clamping the timing ramp, thereby creating a decision point for a new mode of operation. In the presently disclosed embodiment, the resistors $R_{SS1}$–$R_{SS2}$ are employed to clamp or not to clamp the soft-start signal, thereby determining the state of the signals FREQSEL1–FREQSEL2 and the mode of operation of the oscillator. As described above, the oscillator is configured to generate multiple frequencies and is therefore capable of operating in a plurality of modes.

In addition, it should be understood that the resistors $R_{SS1}$–$R_{SS2}$ were used to clamp the soft-start signal for purposes of illustration only. It should be appreciated that a diode or any other suitable element may be employed instead of or in conjunction with one or more resistors to clamp the timing ramp.

It will be appreciated by those of ordinary skill in the art that modifications to and variations of the above-described frequency selection of switch mode power converters via soft-start voltage level may be made without departing from the inventive concepts disclosed herein. Accordingly, the invention should not be viewed as limited except as by the scope and spirit of the appended claims.

What is claimed is:

1. Circuitry, comprising:
   at least one first timing circuit including a first input, a first output, and a current source, the first input being electrically coupled to the first output, the first input being coupleable to at least one capacitor and at least one clamping element,
   wherein the current source is operative to apply a constant current to the capacitor, thereby generating a ramped timing signal at the first input and providing the ramped timing signal to the first output electrically coupled to the first input, and wherein the timing signal provided at the first output of the first timing circuit has an associated first state in the event only the capacitor is coupled between the first input and ground, and an associated second state in the event the clamping element is coupled between the first input and ground; and a second circuit operable in a plurality of modes having at least one control input and a second output, the control input being electrically coupled to the first output of the first timing circuit, wherein the second circuit is configured to operate in a first mode in the event the timing signal having the associated first state is provided to the control input via the first output, and to operate in a second mode in the event the timing signal having the associated second state is provided to the control input via the first output.

2. The circuitry of claim 1 wherein the first timing circuit comprises a soft-start circuit.

3. The circuitry of claim 2 wherein the soft-start circuit is configured to generate a soft-start signal having an associated soft-start time (T.sub.SS), and wherein T.sub.SS is determined by a predetermined value of the capacitor.

4. The circuitry of claim 3 wherein T.sub.SS is determined by a formula $C.sub.SSx(\text{Farads}) = T.sub.SS(\text{sec}) \times 2.3 \times 10.\text{sup.}-6.$ 5. The circuitry of claim 1 wherein the second circuit comprises an oscillator.

6. The circuitry of claim 5 wherein the oscillator is configured to generate a plurality of first switching frequencies in the event the timing signal having the associated first state is provided to the control input, and to generate a plurality of second switching frequencies in the event the timing signal having the associated second state is provided to the control input.

7. The circuitry of claim 6 wherein the plurality of first switching frequencies includes at least one first low switching frequency and at least one first high switching frequency, wherein the oscillator is configured to generate the first low switching frequency during a first time period, and wherein the oscillator is configured to generate the first high switching frequency during a second time period subsequent to the first time period.

8. The circuitry of claim 6 wherein the plurality of second switching frequencies includes at least one second low switching frequency and at least one second high switching frequency, wherein the oscillator is configured to generate the second low switching frequency during a first time period, and wherein the oscillator is configured to generate the second high switching frequency during a second time period subsequent to the first time period.

9. A method of generating at least one soft-start signal and at least one switching frequency, comprising the steps of:

providing at least one soft-start circuit including a first input, a first output and a current source, the first input being electrically coupled to the first output, the first input being coupleable to at least one capacitor and at least one resistor;

applying a constant current to the capacitor by the current source, thereby generating a ramped soft-start signal at the first input and providing the ramped soft-start signal to the first output electrically coupled to the first input, wherein the soft-start signal provided at the first output of the soft-start circuit has an associated first state in the event only the capacitor is coupled between the first input and ground, and an associated second state in the event the resistor is coupled between the first input and ground;

providing an oscillator having at least one control input and a second output, the control input being electrically coupled to the first output of the soft-start circuit;

in the event the soft-start signal having the associated first state is provided to the control input via the first output, generating at least one first switching frequency by the oscillator; and in the event the soft-start signal having the associated second state is provided to the control input via the first output, generating at least one second switching frequency by the oscillator.

10. The method of claim 9 wherein the applying step includes generating a soft-start signal having an associated soft-start time (T.sub.SS) by the soft-start circuit, and determining T.sub.SS by a predetermined value of the capacitor.

11. The method of claim 10 wherein the applying step includes determining T.sub.SS by a formula $C.sub.SSx(\text{Farads}) = T.sub.SS(\text{sec}) \times 2.3 \times 10.\text{sup.}-6.$ 12. The method of claim 9 wherein the first generating step includes generating a plurality of first switching frequencies in the event the soft-start signal having the associated first state is provided to the control input, and wherein the second generating step includes generating a plurality of second switching frequencies in the event the soft-start signal having the associated second state is provided to the control input.

13. The method of claim 12 wherein the plurality of first switching frequencies includes at least one first low switching frequency and at least one first high switching frequency, and wherein the first generating step includes generating the first low switching frequency during a first time period and generating the first high switching frequency during a second time period subsequent to the first time period.

14. The method of claim 12 wherein the plurality of second switching frequencies includes at least one second low switching frequency and at least one second high switching frequency, and wherein the second generating step includes generating the second low switching frequency during a first time period and generating the second high switching frequency during a second time period subsequent to the first time period.

15. A switch mode power converter configured to receive an input voltage and to generate an output voltage, comprising:

at least one soft-start circuit including a first input, a first output, and a current source, the first input being electrically coupled to the first output, the first input being coupleable to at least one capacitor and at least one resistor, wherein the current source is operative to apply a constant current to the capacitor, thereby generating a ramped soft-start signal at the first input and providing the ramped soft-start signal to the first output electrically coupled to the first input, wherein the soft-start signal provided at the first output of the soft-start circuit has an associated first state in the event only the capacitor is coupled between the first input and ground, and an associated second state in the event the resistor is coupled between the first input and ground; and an oscillator having at least one control input and a second output, the control input being electrically coupled to the first output of the soft-start circuit, wherein the oscillator is configured to generate a plurality of first switching frequencies in the event the soft-start signal having the associated first state is provided to the control input via the first output, and to generate a plurality of second switching frequencies in the event the soft-start signal having the associated second state is provided to the control input via the first output.

16. The converter of claim 15 wherein the plurality of first switching frequencies includes at least one first low switching frequency and at least one first high switching frequency, and wherein the oscillator is configured to generate the first low switching frequency during a first time period, and to generate the first high switching frequency during a second time period subsequent to the first time period in the event the output voltage has stabilized.

17. The converter of claim 15 wherein the plurality of second switching frequencies includes at least one second low switching frequency and at least one second high switching frequency, and wherein the oscillator is configured to generate the second low switching frequency during a first time period, and to generate the second high switching frequency during a second, time period subsequent to the first time period in the event the output voltage has stabilized.

18. A method of operating a switch mode power converter, the converter including at least one soft-start circuit and an oscillator, the soft-start circuit including a first input, a first output, and a current source, the first input being electrically coupled to the first output, the oscillator having at least one control input and a second output, the control input being electrically coupled to the first output of the soft-start circuit, comprising the steps of:

receiving an input voltage and generating an output voltage by the switch mode power converter;

applying a constant current to the capacitor by the current source, thereby generating a ramped soft-start signal at the first input and providing the ramped soft-start signal to the first output electrically coupled to the first input, wherein the soft-start signal provided at the first output of the soft-start circuit has an associated first state in the event only a capacitor is coupled between the first input and ground, and an associated second state in the event a resistor is coupled between the first input and ground;

in the event the soft-start signal having the associated first state is provided to the control input via the first output, generating a plurality of first switching frequencies by the oscillator; and in the event the soft-start signal having the associated second state is provided to the control input via the first output, generating a plurality of second switching frequencies by the oscillator.

19. The method of claim 18 wherein the plurality of first switching frequencies includes at least one first low switching frequency and at least one first high switching frequency, and wherein the first generating step includes generating the first low switching frequency during a first time period and generating the first high switching frequency during a second time period subsequent to the first time period in the event the output voltage has stabilized.

20. The method of claim 18 wherein the plurality of second switching frequencies includes at least one second low switching frequency and at least one second high switching frequency, and wherein the second generating step includes generating the second low switching frequency during a first time period and generating the second high switching frequency during a second time period subsequent to the first time period in the event the output voltage has stabilized.

* * * * *